Figure 1:
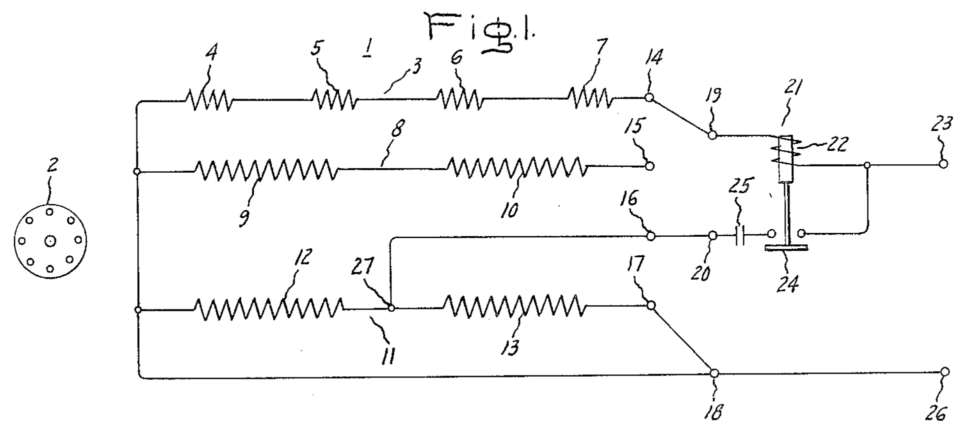

DUAL FREQUENCY SINGLE PHASE ALTERNATING CURRENT MOTOR

Filed July 10, 1953 2 Sheets-Sheet 1

Inventor:
Sol London,
by [signature]
His Attorney.

Sept. 6, 1955 S. LONDON 2,717,348

DUAL FREQUENCY SINGLE PHASE ALTERNATING CURRENT MOTOR

Filed July 10, 1953 2 Sheets-Sheet 2

Inventor:
Sol London,
by Robert G. Ivies
His Attorney.

United States Patent Office 2,717,348

Patented Sept. 6, 1955

2,717,348

DUAL FREQUENCY SINGLE PHASE ALTERNATING CURRENT MOTOR

Sol London, Fort Wayne, Ind., assignor to General Electric Company, a corporation of New York Application July 10, 1953, Serial No. 367,213

6 Claims. (Cl. 318—221)

This invention relates to single phase, alternating current motors, and more particularly to such motors adaptable for use on either of two frequencies of supply voltage.

In certain areas, more than one frequency of alternating current power is available, such as 25 cycles and 60 cycles, and in other areas, the electric utilities are in the process of converting old 25 cycle systems to the more desirable 60 cycle system. In such areas, it is desirable to have certain domestic appliances, such as refrigerators, operable on either of two frequencies. It is therefore desirable to provide a single phase, alternating current motor which can be operated on either of two supply frequencies with minimum change in connections.

Dual frequency single phase alternating current motors have been constructed in the past having two pole main windings and two pole starting windings for use on the lower frequency and also having four pole main windings and four pole starting windings for use on the higher frequency. It is obvious that the provision of complete duplicate sets of windings to permit operation on both frequencies increases both the size and the cost of the motor. It is therefore desirable to provide a dual frequency, single phase alternating current motor which reduces the number of windings required thus producing a corresponding reduction in overall size and cost.

It is therefore an object of this invention to provide an improved dual frequency single phase alternating current motor incorporating the desirable features set forth above.

Further objects and advantages of this invention will become apparent and the invention will be better understood by reference to the following description and the accompanying drawing, and the features of novelty which characterize this invention will be pointed out with particularity in the claims annexed to and forming a part of this specification.

In accordance with this invention, a dual frequency single phase alternating current motor is provided having a first running winding forming 4 poles and a second running winding forming 2 poles. Only a single starting winding is provided having a plurality of sections which form two poles. For operation on the lower frequency, the two pole running winding is connected across the source of power and the starting winding sections are serially connected thereacross so that the starting winding poles are at opposite polarities. For operation on the higher frequency, the four pole running winding is connected across the source of power and the starting winding sections connected in parallel thereacross so that the starting winding poles are of the same polarity. With the starting winding poles at the same polarity, two consequent poles are formed providing the four poles needed for the higher frequency operation. Such a motor may of course be operated with either a starting relay or a speed responsive switch and may be provided with a starting capacitor.

Figure 2:
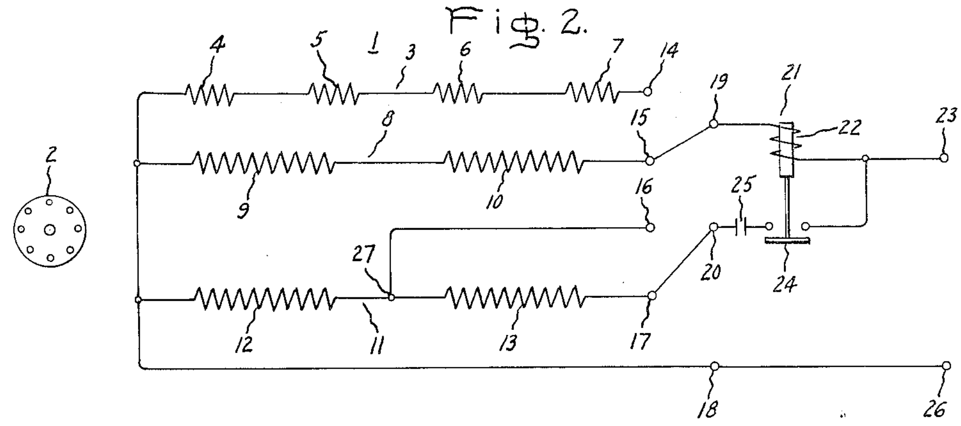
Figure 3:
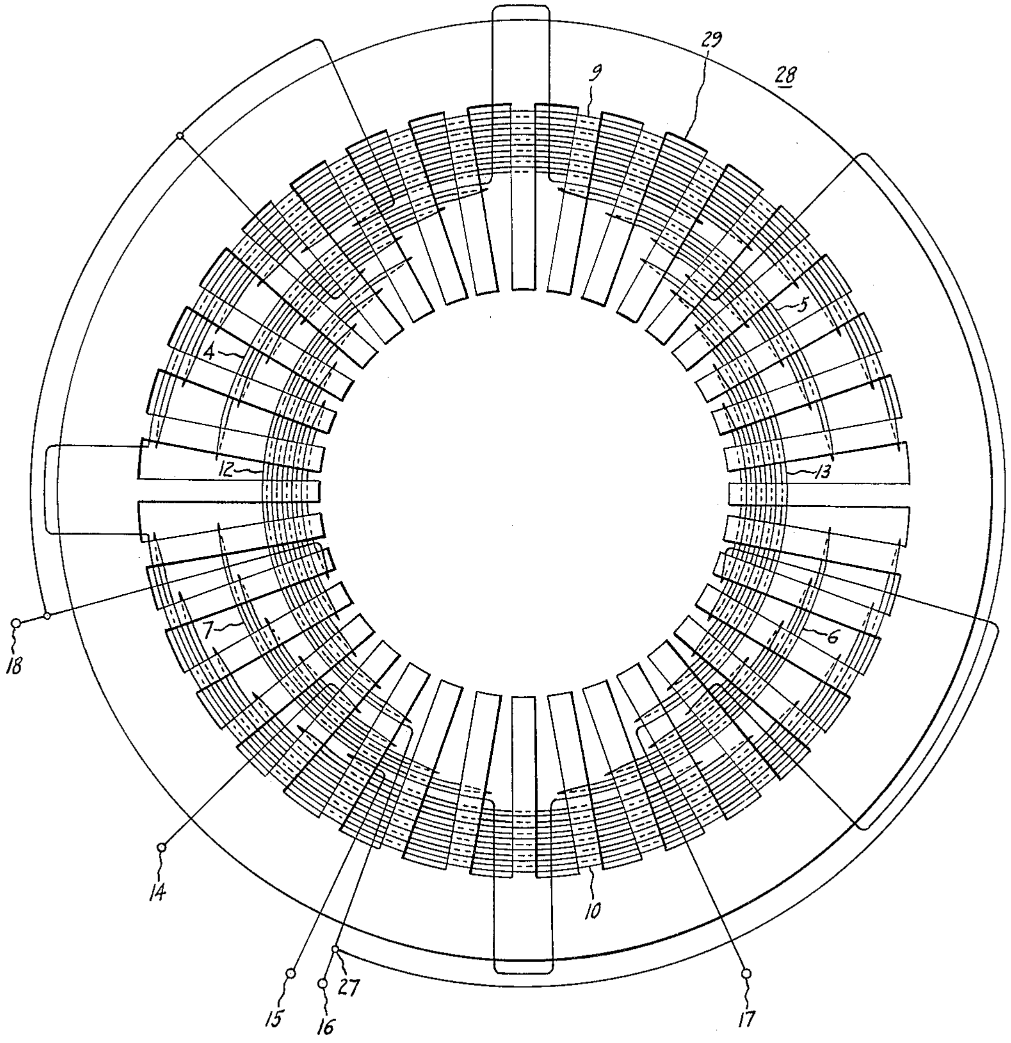

In the drawing, Fig. 1 is a schematic illustration of the windings of the improved dual frequency single phase alternating current motor of this invention, shown connected for operation on the higher frequency; and Fig. 2 is a similar illustration showing the windings connected for operation on the lower frequency; and Fig. 3 shows a stator member for an alternating current motor having the windings of Figs. 1 and 2 emplaced therein.

Referring now to Fig. 1, there is schematically shown a dual frequency single phase alternating current motor 1 having a conventional squirrel cage rotor 2. A conventional stator core is provided (not shown) in which the windings now to be described are arranged. A first running winding 3 is provided having four serially connected sections 4, 5, 6, and 7 respectively forming four running poles. A second running winding 8 is also provided having two serially connected sections 9 and 10 respectively forming two running poles. A starting winding 11 is provided, conventionally physically displaced from the running windings 3 and 8, as is well-known in the art, having two serially connected sections 12 and 13 forming two poles, as will be hereinafter more fully described.

Five terminals 14, 15, 16, 17 and 18 are provided which cooperate with other terminals 19 and 20 for making the necessary connection changes for operating the motor on either a higher frequency, such as 60 cycles, or a lower frequency, such as 25 cycles. A starting relay 21 is provided having an operating coil 22 with one end connected to terminal 19 and its other end connected to external terminal 23. Relay 21 is provided with a normally open contact 24 serially connected with starting capacitor 25 between terminal 20 and external terminal 23. Terminal 18 is permanently connected to the other external terminal 26. The external terminals 23 and 26 are adapted to be connected to the external source of power (not shown). One end of running winding 3 is connected to terminal 14, one end of running winding 8 is connected to terminal 15, and one end of starting winding 11 is connected to terminal 17. The other ends of each of the windings are connected to terminal 18 and the midpoint 27 between starting winding sections 12 and 13 is connected to terminal 16.

In order to operate the motor 1 from the higher of two frequencies, for example 60 cycles, terminals 14 and 19 are connected together, terminals 16 and 20 connected together, and terminals 17 and 18 connected together. It will now be seen that the four pole running winding 3 is connected across the higher frequency source of alternating current with operating coil 22 of starting relay 21 in series therewith, and that starting winding sections 12 and 13 are connected in parallel across the external source with relay contact 24 and capacitor 25 in series therewith. With starting winding sections 12 and 13 connected in parallel, they will form poles of the same polarity thus forming consequent poles in the stator core providing a four-pole starting field. It will be readily understood that when the motor is initially connected across the source of alternating current, there will be a high input rush of current which will energize relay 21 closing its contact 24 thus connecting the starting winding 11 in the circuit. When the motor comes up to speed, the current flowing in the running winding 3 will have fallen sufficiently to allow relay 21 to drop out thus opening its contact 24 and disconnecting starting winding 11.

Referring now to Fig. 2, which shows the same circuit elements as Fig. 1, connected for operation on the lower frequency, such as 25 cycles, it is seen that terminal 15 is connected to terminal 19 and terminal 17 is connected to terminal 20. It will now be seen that running winding 8 is connected across the external source of power with operating coil 22 of starting relay 21 in series therewith and that sections 12 and 13 of starting winding 11 are also serially connected across the source of power with contact 24 of starting relay 21 and capacitor 25 in series therewith. It is thus seen that starting winding sections 12 and 13 will produce poles of opposite polarity thus providing the requisite two-pole starting field to correspond to the two-pole field provided by running winding 8. Here again, initial connection of the motor 1 to the external source of power will cause relay 21 to pick up due to the inrush of starting current thus connecting starting winding 11 in circuit. After the motor has come up to speed, current in running winding 8 will diminish thus allowing relay 21 to drop out disconnecting starting winding 11 from the circuit.

Referring now to Fig. 3, there is shown a stator member 28 for an alternating current induction motor formed of a plurality of the relatively thin laminations of magnetic material. The stator member 28 has a plurality of winding slots 29 formed therein, shown here as being thirty-six in number. It will be seen that sections 9 and 10 of the two-pole running winding 8 respectively span 7, 9, 11, 13, 15, and 17 teeth while sections 4, 5, 6, and 7 of four-pole running winding 3 respectively span 2, 4, 6, and 8 teeth. It will also be seen that sections 12 and 13 of starting winding 11 respectively span 5, 7, 9, 11, and 13 teeth leaving five unspanned teeth on diametrically opposite sides of the stator. By having the starting winding span only approximately ⅔ of the available pole pitch, sufficient teeth are left to form strong consequent poles for four-pole operation.

While a current responsive starting relay is shown to disconnect the starting winding at the desired speed, it will be readily understood that a suitable mechanical speed responsive device, such as a centrifugal switch may be utilized. In addition, the starting capacitor 25 may be eliminated in the event that the starting characteristics of a resistance-split motor are satisfactory for the particular application involved.

It will now be readily apparent that this invention provides an improved dual frequency, single phase, alternating current motor using only one starting winding rather than the two separate starting windings conventionally used. It is obvious that the elimination of one starting winding reduces the overall size and cost of the motor without duly complicating the changes in connections necessary to adapt the motor for operation on one frequency or the other.

While I have shown and described a particular embodiment of this invention, further modifications and improvements will occur to those skilled in the art. I desire that it be understood therefore that this invention is not limited to the form shown and I intend in the appended claims to cover all modifications which do not depart from the spirit and scope of this invention.

What I claim as new and desire to secure by Letters Patent of the United States is:

1. A dual frequency single phase alternating current motor comprising a first running winding forming four poles, a second running winding forming two poles, a starting winding having a plurality of sections forming two poles, and means for at times connecting said first running winding across a source of alternating current having a first frequency and said starting winding sections in parallel across said source, said starting winding poles being arranged to have the same polarity when so connected thereby to form consequent poles, and for at other times connecting said second running winding across a source of alternating current having a second frequency lower than said first frequency and said starting winding sections in series across said last named source, said starting winding poles being arranged to have opposite polarity when so connected.

2. A dual frequency single phase alternating current motor comprising a first running winding having a plurality of serially connected sections forming four poles, a second running winding having a plurality of serially connected sections forming two poles, a starting winding having a plurality of sections forming two poles, and means for at times connecting said first running winding across a source of alternating current having a first frequency and said starting winding sections in parallel across said source, said starting winding poles being arranged to have the same polarity when so connected thereby to form consequent poles and for at other times connecting said second running winding across a source of alternating current having a second frequency lower than said first frequency and said starting winding sections in series across said last named source, said starting winding poles being arranged to have opposite polarities when so connected.

3. A dual frequency single phase alternating current motor comprising a first running winding having four serially connected sections forming four poles, a second running winding having two serially connected sections forming two poles, a starting winding having two sections forming two poles, and means for at times connecting said first running winding across a source of alternating current having a first frequency and said starting winding sections in parallel across said source, said starting winding poles being arranged to have the same polarity when so connected thereby to form consequent poles and for at other times connecting said second running winding across a source of alternating current having a second frequency lower than said first frequency and said starting winding sections in series across said last named source, said starting winding poles being arranged to have opposite polarities when so connected.

4. A dual frequency single phase alternating current motor comprising five terminals, a first running winding having four serially connected sections forming four poles, one end of said first running winding being connected to the first of said terminals and the other end thereof being connected to the second of said terminals, a second running winding having two serially connected sections forming two poles, said second running winding having one end connected to the third of said terminals and the other end thereof connected to said second terminal, a starting winding having two serially connected sections forming two poles, said starting winding having one end connected to the fourth of said terminals and the other end thereof connected to said second terminal, the mid-part between said starting winding sections being connected to the fifth of said terminals, said first and fifth terminals being adapted to be connected to one side of a source of alternating current having a first frequency and said second and fourth terminals being adapted to be connected to the other side of said source whereby said first running winding is connected across said source and said starting winding sections are connected in parallel thereacross, said starting winding sections being arranged to have the same polarity when so connected thereby to form consequent poles, said third and fourth terminals being adapted to be connected to one side of a source of alternating current having a second frequency lower than said first frequency and said second terminal being adapted to be connected to the other side of said last named source whereby said second running windings connected across said last named source and said starting winding sections are serially connected thereacross, said starting winding sections being arranged to have opposite polarities when so connected.

5. A dual frequency single phase alternating current motor comprising a first running winding having four sections forming four poles, a second running winding having two sections forming two poles, a starting winding having two sections forming two poles, a starting relay having an operating coil with one side thereof connected to a first external terminal, said relay having a normally open contact, a starting capacitor connected between said first external terminal and said contact, said first and second running windings and said starting winding each having one end thereof connected to a second external terminal; switching means arranged selectively to connect the other side of said relay operating coil to the other end of said first running winding, said contact to the midpoint between said starting winding sections, and the other end of said starting winding to said second external terminal when a source of alternating current having a first frequency is connected to said external terminal; and to connect said other side of said relay operating coil to the other end of said second running winding and said contact to the other end of said starting winding when a source of alternating current having a second frequency lower than said first frequency is connected to said external terminals.

6. A dual frequency single phase alternating current motor comprising a stator winding having a plurality of winding slots formed therein defining teeth therebetween, a first running winding having four serially connected sections positioned in said slots and forming four poles, a second running winding having two serially connected sections positioned in said slots forming two poles, a starting winding having two sections positioned in said slots forming two poles, said starting winding sections being serially connected when said first running winding is energized, said starting winding sections being connected in parallel when said second running winding is energized, said first and second running windings respectively spanning substantially all of the available pole pitch of said stator member, said starting winding spanning approximately two-thirds of the available pole pitch of said stator member.

References Cited in the file of this patent

UNITED STATES PATENTS

| | | |
|---|---|---|
| 1,859,368 | Kennedy | May 24, 1932 |
| 1,859,369 | Kennedy | May 24, 1932 |
| 1,880,565 | Weichsel | Oct. 4, 1932 |
| 1,983,741 | Dederick | Dec. 11, 1934 |
| 2,671,879 | Schwarz | Mar. 9, 1954 |